Oct. 31, 1939.   W. L. POLLARD   2,177,946
VARIABLE SPEED TRANSMISSION
Original Filed Feb. 4, 1935    5 Sheets—Sheet 1
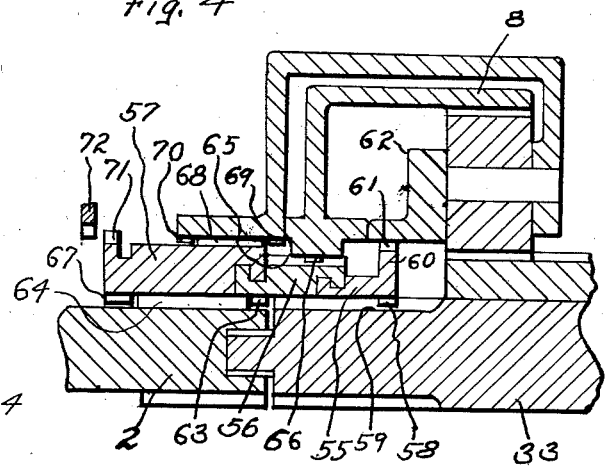
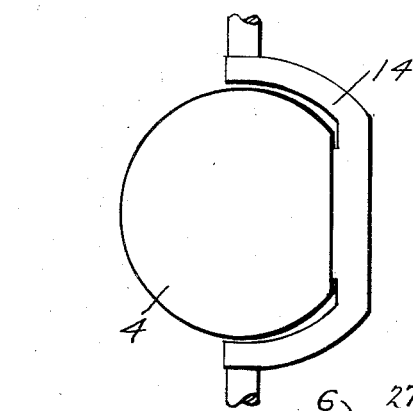
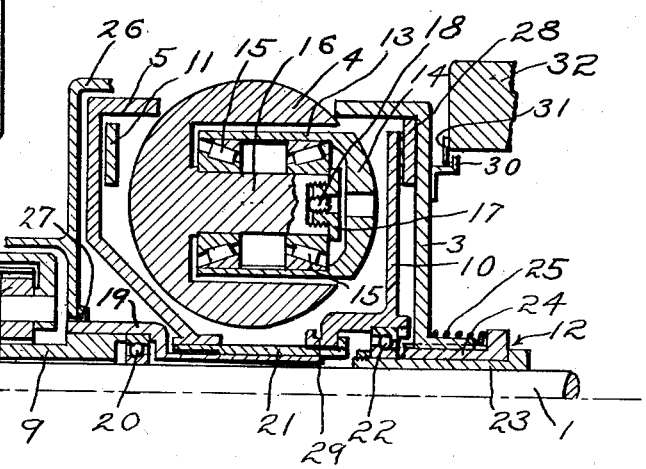
INVENTOR.
W. L. Pollard
BY
Jones, Addington, Ames & Seibold
ATTORNEY.

Oct. 31, 1939.      W. L. POLLARD      2,177,946
VARIABLE SPEED TRANSMISSION
Original Filed Feb. 4, 1935    5 Sheets-Sheet 2

Inventor
W. L. Pollard
By
Jones, Addington, Ames & Seibold
Attys

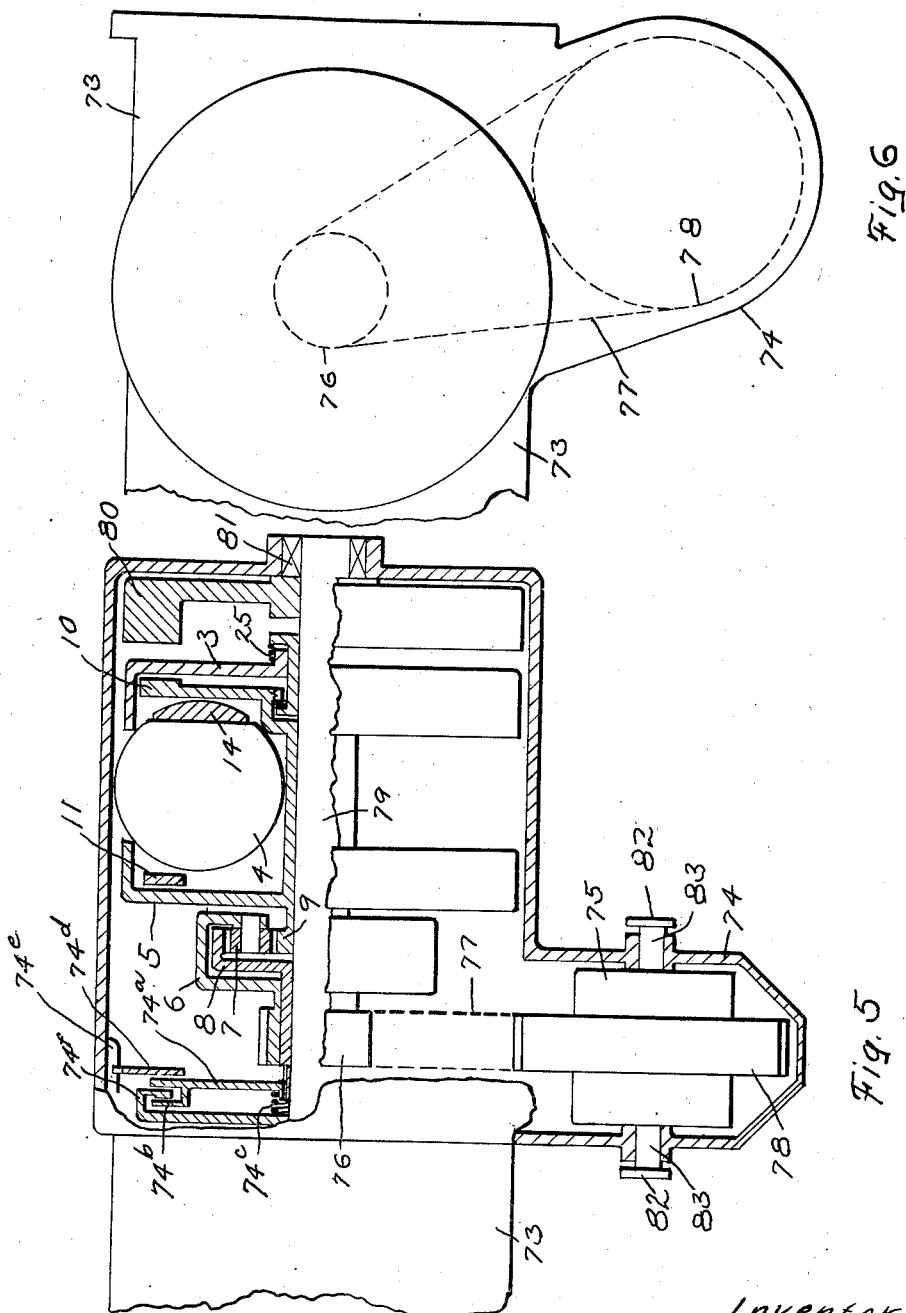

Oct. 31, 1939. W. L. POLLARD 2,177,946
VARIABLE SPEED TRANSMISSION
Original Filed Feb. 4, 1935 5 Sheets—Sheet 4
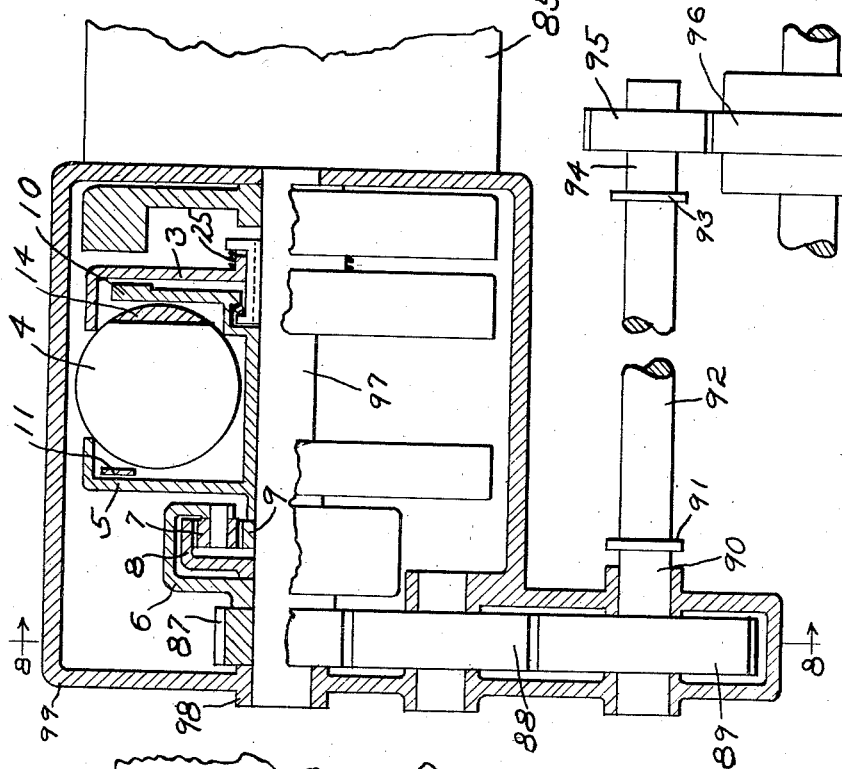

Oct. 31, 1939.  W. L. POLLARD  2,177,946
VARIABLE SPEED TRANSMISSION
Original Filed Feb. 4, 1935  5 Sheets-Sheet 5

Inventor
W. L. Pollard
By
Jones, Addington, Ames & Seibold
Attys

Patented Oct. 31, 1939

2,177,946

UNITED STATES PATENT OFFICE 2,177,946

VARIABLE SPEED TRANSMISSION

Willard L. Pollard, Evanston, Ill.

Application February 4, 1935, Serial No. 4,819
Renewed January 14, 1938

35 Claims. (Cl. 74—284)

My invention relates to transmissions. More specifically, it relates to a continuous power polyphase clutch synchronizing friction planetary transmission. In one of its aspects, the construction shown may be considered as a device for changing gear speed ratios without interfering with the power flow, that is to say, without declutching or letting up on the throttle of the motor.

One of the objects of my invention is to provide a variable speed transmission in which there will be a continuous flow of power as the speed ratio is being changed and in which clutch mechanisms are brought into synchronism to enable the friction drive to be dropped out at various speed ratios.

A further object is to provide a combination friction and planetary transmission in which only a part of the torque is transmitted through the friction drive.

A further object is to provide an improved friction gear transmission in which the friction drive is used only a small part of the time.

A further object is to provide an improved friction gear drive in which clutch mechanisms are controlled by the contour of one of the friction elements.

A further object is to provide an improved gear drive in which the effective radius of certain friction members is relatively large, whereby the pressure required is lessened.

A further object is to provide an improved transmission in which the clutch mechanism is not subjected to excessive torque.

Further objects and advantages of the invention will be apparent from the description and claims.

In the drawings, in which several forms of my invention are shown,

Figure 1 is a somewhat diagrammatic axial sectional view of one form of my improved transmission;

Fig. 2 is a side elevational view of the spherical idler and its mounting yoke;

Fig. 4 is an enlarged axial sectional view showing details of the clutch and planetary mechanism of Fig. 3.

Fig. 5 is an axial sectional view showing my improved transmission used in connection with a motor placed near the differential housing of an automobile;

Fig. 6 is an elevational view from the right of Fig. 5;

Fig. 7 is a view showing another form of my transmission applied to a motor located adjacent the differential housing of an automobile;

Fig. 8 is a sectional view substantially on the line 8—8 of Fig. 7;

Figure 3:
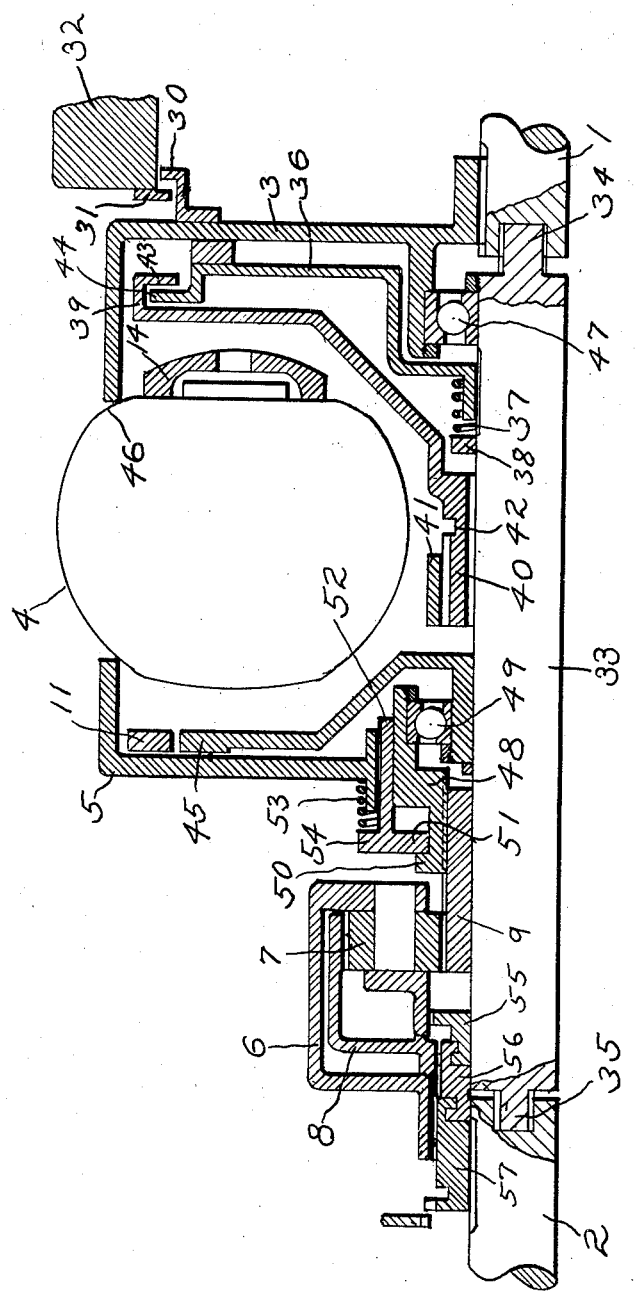
Fig. 3 is an axial sectional view showing another form of my invention.

Referring to the drawings in detail, and first to Figs. 1 and 2, the construction shown therein comprises a driving shaft 1 which may be driven directly from the motor of an automobile, a driven shaft 2 which may be the propeller shaft of an automobile, a dish-shaped friction wheel 3 rotatable with the driving shaft, a number of spheroidal idlers 4 (only one being shown) driven by the driving disc, a second dish-shaped friction wheel 5 driven by the spherical idler, a planetary transmission mechanism comprising a cage or gear carrier 6 rotatable with the propeller shaft 2, a plurality of planet gears 7 (only one being shown mounted on this gear carrier), a ring gear 8 mounted on the drive shaft 1 and meshing with the planet gears 7, and a sun gear 9 also meshing with the planet gears and rotatable with the driven friction wheel. A clutch plate 10 controlled by the contour of the spheroidal idler 4 is provided for connecting the driven wheel 5 to rotate directly with the driving wheel 3 when the two wheels are brought into synchronism. A fixed annular brake plate 11 is provided, also controlled in its action by the contour of the spheroidal idler 4 for holding the driven wheel 5 against rotation when the position of the spheroidal idler is such as to bring this driven wheel substantially to a stop. A load-controlled cam mechanism 12 is provided whereby the pressure between the spheroidal idler and the friction wheels is caused to be substantially proportional to the load on the driven friction wheel.

As indicated above, the surface of the spheroidal idler is not exactly spherical throughout its entire extent, portions of each being flattened off or reduced in radius for controlling the axial positions of the friction wheels 3 and 5. The spheroidal idler is rotatably mounted in a cup-like bearing housing 13, which bearing housing is integral with the mounting yoke 14 (Fig. 2) used in shifting the spherical idler to change the speed ratio. Suitable anti-friction bearings 15 capable of resisting both radial and axial pressure are provided between the stub shaft 16 on the spheroidal idler and the housing member 13. These anti-friction bearings are held in place by means of a nut 17 threaded into the end of the stub shaft 16, the nut itself being locked in adjusted position by means of a screw 18 threaded into the nut and bearing on the bottom of a pocket in the stub shaft. The mounting yoke itself is mounted in suitable bearings (not shown), the axis of which substantially intersects the center of the spheroidal idler. With this construction, it will be seen that by rocking the yoke on its bearings the spheroidal idler may be moved from the position shown in Fig. 1, in which the driving and driven wheels are rotating in substantial synchronism, to a position in which the pole of the spheroidal idler will be brought opposite the adjacent portion of the driven friction wheel. In this position, the driven friction wheel will be substantially stationary and as the portion of the spheroidal idler adjacent the pole is flattened off (as shown in larger scale in Fig. 3), the driven friction wheel will shift axially to the right, as seen in Fig. 1, permitting it to come in contact with the stationary brake ring 11, thus holding the driven friction wheel against rotation without any further action on the part of the spheroidal idler. As will be explained more in detail later, both the driven friction wheel and the driving friction wheel are capable of adjusting themselves axially to the position determined by the contour of the spheroidal idler. This enables the spheroidal idler to be used not only as a power-transmitting member but as a clutch and brake-controlling member.

The sun gear of the planetary gearing has a drive fit in the sleeve 19 on which the driven friction wheel is splined so as to be capable of axial movement thereon. A suitable anti-friction bearing 20 is provided between this sleeve and the drive shaft. The driven friction wheel 5 is secured solidly on the sleeve 21 which is splined on the pinion carrying sleeve 19 and the clutch plate 10 is also secured solidly on this sleeve. A swivel thrust bearing 22 is provided between the clutch plate 10 and the cam sleeve 23 which is splined on the driving shaft 1. The combination spring and cam pressure controller for controlling the pressure between the spheroidal idler and the friction wheels comprises the cam sleeve member 23, splined on the shaft 1, a cam member 24 cooperating with the cam member 23 for causing a load-controlled pressure to be exerted by the friction wheels on the spheroidal idler, and a coil compression spring 25 acting between a flange on the friction member and the driving friction wheel. The hub portion of the driving friction wheel 3 is splined on the driven cam member 24. The two cam sleeve members are provided with engaging cam faces of the general formation shown in my copending application, Serial No. 693,596, so designed that relative rotation in either direction of the cam sleeves with respect to each other will cause axial movement of the cam sleeves. In the construction shown, the relative movement of the cam sleeves simply changes the tension of the coil compression spring 25 to change the pressure of the friction wheels on the spheroidal idler. It will be seen that both friction wheels can move axially independently of each other, thus enabling them to be controlled by the contour of the spheroidal cam. A casing 26 may be provided for housing both the friction part of the transmission and the planetary gear part, an oil seal 27 being provided to prevent the heavy oil in the gearing from getting into the friction drive housing.

In operation, a continuous rotational movement of the yoke 14 which carries the spheroidal idler will gradually change the speed ratio from a direct one-to-one drive to a ratio in which the propeller shaft 2 will first be completely stopped and then caused to rotate in a direction reverse to that of the motor shaft 1. Assuming that the parts are in direct drive (as shown in Fig. 1) and the yoke is gradually moved in a clockwise direction, the first effect will be to shift the clutch ring 28 of the driving friction wheel out of engagement with the clutch plate 10 connected with the driven friction wheel and to establish a driving relation from the driving friction wheel 3 through the spheroidal idler 4 to the driven friction wheel 5. As the clockwise rotation of the yoke continues, the speed of the driven friction wheel relative to that of the driving friction wheel gradually decreases until it approaches zero as the flattened pole portion of the spheroidal idler approaches the adjacent point of the driven friction wheel 5. The flattening of the pole portion of the idler allows the driven friction wheel 5 to move to the right under the action of the cam and spring construction 24 and 25, causing the inner face of the friction wheel 5 to bear against stationary brake ring 11 and come to a stop as the flattened portion of the idler moves out of contact with the edge of the friction wheel 5. In this position, the friction drive is eliminated and there is an all gear drive through the planetary at about two-thirds of the direct connected ratio. As the idler carrying yoke is rotated still further clockwise, the surface of the idler 4 again comes in contact with the friction wheel 5, pressing it out of engagement with the stationary brake ring 11 and again establishing a friction drive relation between the driving friction wheel and the driven friction wheel, the driven friction wheel 5 now rotating in the opposite direction to that of the driving friction wheel 3 but at a much slower speed. This still further slows up the speed of the propeller shaft 2, since the sun gear 9 is now rotating in a direction opposite to that of the ring gear 8. As the clockwise movement of the yoke 14 continues, the reversely rotating sun gear 9 increases its speed, thus more and more counteracting the forward driving effect of the ring gear 8. As the rotation of the yoke continues still further, the reverse rotation of the sun gear will eventually counteract the forward rotation of the ring gear and bring the gear carrier 6 to a dead stop. Further rotation of the yoke will cause a reverse rotation of the gear carrier 6 at a gradually-increasing speed as the yoke is rotated further.

It will be noted that with this construction only a small proportion of the torque is taken care of by the friction drive, which acts only on the sun gear 9, the greater proportion of the torque being taken care of by the ring gear 8 which is secured directly to the motor shaft 1. It will also be noted that there are two positions in which the friction drive relation is completely discontinued, one, when the clutch plate 10 connects the driven friction wheel 5 directly with the driving friction wheel 3, and the other when the brake ring 11 holds the driven friction wheel 5 against rotation. The friction drive is thus used mainly as a continuous power device for bringing the sun gear 9 into synchronism with the motor shaft 1 and for bringing it to a complete stop to enable the brake ring 11 to hold the sun gear against rotation. Aside from this, the principal function of the friction drive is for low speed ratios and reverse.

The wheel 5 and clutch plate 10 may also be used as a clutch device for disconnecting the propeller shaft 2 from the motor at any time. For this purpose, the hub of the clutch plate 10 is provided wih an annular groove 29 to enable the wheel 5 and clutch plate 10 to be shifted axially when desired, thus disconnecting the sun gear from the power source.

In order to enable the power to be disconnected from the propeller shaft 2 at any time, regardless of whether the driving wheel 3 is in engagement with the spheroidal idler, means are provided for limiting the extreme distance to which the friction wheel 3 can move to the left. The construction provided for this purpose comprises an annular flange 30, secured to the driving wheel 3, which can be moved into engagement with an annular flange 31 secured on the fly wheel 32 which rotates with the driving shaft 1 and is held against axial movement.

The construction in Figs. 3 and 4 is generally similar to that of Figs. 1 and 2 in that it makes use of a spheroidal idler 4 and mounting yoke 14, a similar planetary transmission and a similar construction of driving and driven friction wheels 3 and 5. In this form, however, provision is made for still further clutch mechanism and synchronization with respect thereto. Means are provided whereby the ring gear 8 can be disconnected from the motor shaft 1 and held stationary and means are provided for effecting certain clutching operations in the planetary gear itself. These clutching operations in the planetary itself include means whereby the intermediate motor driven shaft 33 may be disconnected from the ring gear 8 and connected with the gear carrier 6 at the same time that the propeller shaft 2 is disconnected from the gear carrier 6 and connected with the ring gear 8. They also include means whereby in another position the gear carrier 6 is held against any rotation whatsoever, the intermediate drive shaft 33 is disconnected from any driven member whatsoever, and the propeller shaft 2 is connected with the ring gear 8.

Referring first to the construction whereby the ring gear 8 may be disconnected from the driving friction wheel 3 and held against rotation, for this purpose the intermediate shaft 33 is provided having a pilot bearing 34 at one end in the motor shaft 1 and a pilot bearing 35 at the other end in the propeller shaft 2. For connecting and disconnecting this intermediate shaft 33 with respect to the driving friction wheel 3 and for holding it against rotation when thus disconnected, a clutch plate 36 is provided splined on the intermediate shaft 33 and pressed to the right as seen in Fig. 3 by means of a coil compression spring 37 bearing on a collar 38 secured to the intermediate shaft 33, and a combination clutch-shifting member and brake 39 having a hub portion 40 slidable but non-rotatably mounted in a stationary collar 41 surrounding the intermediate shaft 33. A groove 42 is provided in the hub of this clutch-shifting disc 39 by means of which it may be moved to the left, bringing the inwardly-extending flange 43 against the outwardly-extending flange 44 of the clutch disc, thus lifting the clutch disc 36 out of clutching engagement with the driving friction wheel 3 and holding the clutch disc 36 against rotation due to the frictional engagement between the flanges 43 and 44. In this position, the ring gear 8 is held against rotation and the power for the drive is transmitted through the friction wheels 3 and 5 and idler 4 to the sun gear 9, thus enabling a powerful drive to be exerted on the propeller shaft through the friction gearing acting on the sun gear.

For direct drive, the driven friction wheel 5 is direct connected to the intermediate shaft 33 through a clutch disc 45 secured to the intermediate shaft 33 which engages the inner face of the driven friction wheel 5 when the flattened portion 46 of the spheroidal idler allows the driving friction wheel 3 to move to the left, thus allowing the intermediate shaft 33 carrying the clutch disc 45 to move to the left into engagement with the driven friction wheel 5.

The intermediate shaft 33 has a swivel thrust connection with the driving friction wheel 3 by means of a ball thrust bearing 47 and the clutch disc 45 has a swivel thrust connection with the driving sleeve 48 for the sun pinion 9 by means of a ball thrust bearing 49.

The spring and cam pressure controller comprises a cam flange 50 on the pinion drive sleeve 48 engaging a cam flange 51 on a sleeve 52 on which the driven friction wheel 5 is splined. A coil compression spring 53 is provided between a flange 54 on the cam sleeve 52 and the driven friction wheel 5. The action of this spring and cam construction is substantially the same as that described in connection with Figs. 1 and 2. Relative rotation of the two cam flanges 50 and 51 in either direction forces the cam sleeve 52 to the right, increasing the tension of the coil compression spring 53 and thus increasing the pressure of the friction wheels against the idler.

The clutch mechanism for the planetary shown in detail in Fig. 4 comprises three dog clutch sleeve members 55, 56, and 57 having swivel connections with each other whereby they move together as a unit longitudinally but can rotate independently of each other. This three-part swivel clutch unit is movable to any one of three different positions. The right hand clutch member 55 surrounds the intermediate shaft 33 and has a tooth clutch construction 58 always in engagement with a broached portion 59 of the intermediate shaft 33. It also has a toothed clutch construction 60 which in its intermediate position engages the toothed ring portion 61 of a ring 62 which in effect forms part of the gear carrying cage 6, but which clutch construction 60 in either of its other two positions is disengaged from this toothed ring 61. The intermediate clutch portion 56 has a toothed clutch construction 63 which in the right hand position is in engagement with the broached portion 59 of the intermediate shaft and in the intermediate and left hand position is in engagement with the broached portion 64 of the propeller shaft. It also has a broached portion 65 which in all three positions is in engagement with a toothed clutch portion 66 on the ring gear 8. The left hand clutch member 57 has a toothed clutch portion 67 which both in the right hand position and in the intermediate position is in engagement with the broached portion 64 on the propeller shaft but which in the left hand position is out of engagement with this broached portion. It also has a broached clutch portion 68 which in the right hand position is in engagement with a toothed clutch contially the same as that of Fig. 1. In this construction however the universal joint construction, to enable relative motion between the motor and the traction wheels, is different. The drive from the planet cage 6 to the differential housing 86 is from a spur gear 87 rotatable with the planet cage through an idler gear 88, a spur gear 89 meshing with the idler gear 88, a shaft 90 driven by this spur gear, a universal joint 91, an intermediate shaft member 92, a universal joint 93, a short shaft 94 driven from the universal joint 93, and a spur gear 95 on this short shaft 94 meshing with a large spur gear 96 on the differential housing 86. The motor shaft 97 extends completely through the transmission housing, the right hand end of the shaft being mounted in a suitable bearing 98 in the transmission housing 99.

Figure 9:
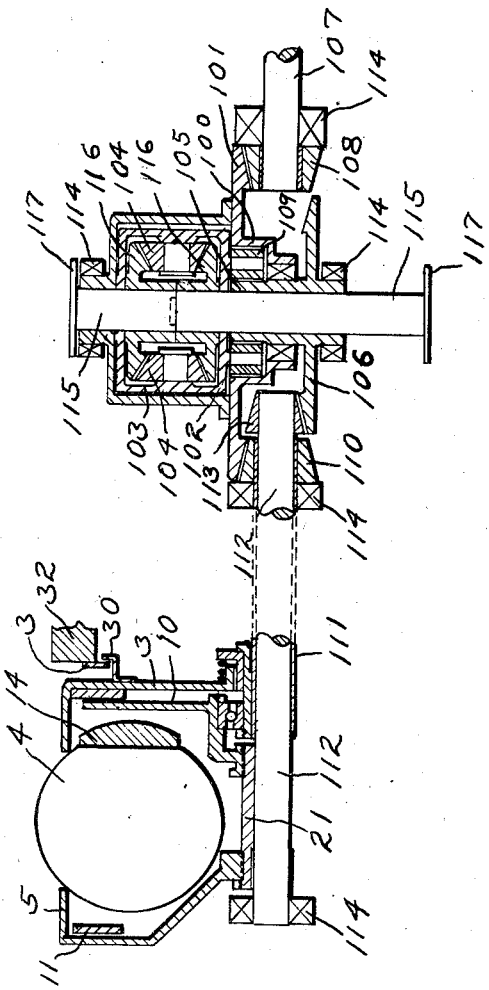
Fig. 9 is an axial sectional view showing another application of my transmission in connection with a motor located adjacent the differential housing.

In Fig. 9 is shown an adaptation of the transmission for combination with the differential and its drive. In this construction a planetary transmission is inserted in the differential housing, the ring gear 100 of this planetary being rotatable directly with the main bevel ring gear 101 of the differential drive, the planet cage 102 being connected with the differential housing 103 which carries the equalizer gears 104 and the sun gear 105 being controlled in its speed by a variable speed friction transmission similar to the variable speed portion of the transmission shown in Figs. 1 and 2. This variable speed friction transmission takes its drive from the main ring gear 101 of the differential drive and comes back into the rear end housing to drive a bevel gear 106 which rotates the sun gear 105 of the planetary.

Referring more in detail to the construction, this comprises the propeller shaft 107 which rotates directly with the motor shaft, a bevel pinion 108 rotatable with the propeller shaft, the main ring gear 101 driven from this bevel pinion 108, the internal planetary ring gear 100 formed as an integral part of the bevel ring gear 101, a set of planet gears 109 meshing with the ring gear 100, the differential housing 103 on which the planet gears 109 are mounted, a suitable differential mechanism mounted in the differential housing, a bevel pinion 110 meshing with the large ring gear, a sleeve 111 on which this beveled pinion is mounted, a variable speed friction transmission from this sleeve to a shaft 112 coaxial with this sleeve 111 and extending therethrough, a small bevel pinion 113 on the end of this shaft 112, the bevel gear 106 meshing with this small bevel pinion 113, and the sun gear 105 rotatable with this bevel gear 106 and meshing with the planet gears 109. The variable speed friction transmission may be in general of the type shown in Figs. 1 and 2 comprising the driving wheel 3, the idler 4, the driven wheel 5, the clutch mechanism 10, the brake ring 11, and the sleeve 21 on which the driven wheel 5 is mounted, splined on the driven shaft 112. Suitable bearings 114 are provided for the stub axles 115, for the sleeve 111, and shafts 112 and 107. The differential mechanism is in general similar to known types comprising the equalizer gears 104 mounted on stub shafts on the differential housing 103 and the axle drive gears 116 rotatable with the axle drive shafts 115, respectively, and meshing with the equalizer gears 104. Universal joints 117 may be provided between the axle drive shafts 115 and the axles if it is desired to permit the traction wheels to move up and down relatively to the rear end housing.

In use, it will be seen when the driven wheel 5 is direct connected to the driving friction wheel 3 through the clutch 10, the shaft 112 will rotate at the same speed as the sleeve 111, thus causing the small bevel gear 113 to rotate at the same speed as the larger bevel gear 110. By suitable design of gearing, this will cause the sun gear 105 to travel at the same speed and in the same direction as the internal ring gear 110, thus giving in effect a one-to-one drive. As the yoke 14 carrying the spheroidal idler 4 is moved clockwise, the speed of the small bevel gear 113 will gradually become less, thus slowing up the rotation of the sun gear 105 and consequently of the differential housing 103, thus gradually reducing the speed. When the spheroidal idler 4 is moved to a position which permits the driven friction wheel 5 to be stopped by the stationary brake ring 11, the small bevel gear 113 will be held against rotation and as a consequence the sun gear 105 also will be held against rotation. This eliminates the friction drive for the time being and enables an all-gear drive at a speed of about two-thirds that of direct drive. If the yoke 14 carrying the spheroidal idler is moved still further clockwise, it will bring the spheroidal idler again into driving relation with respect to the driven friction wheel, at the same time moving it out of contact with the stationary brake ring 11. This will result in a rotation of the driven friction wheel 5 in a direction reverse to that of the driving friction wheel and will cause a rotation of the small bevel gear 113 in a direction the reverse of that of the larger bevel gear 110. This will result in a reverse rotation of the sun gear 105, thus still further slowing up the speed of the differential housing 103. As the yoke is swung still further clockwise, the rotation of the sun gear in a reverse direction will continue to increase until finally the effect of the reverse rotation of the sun gear 105 completely counteracts the effect of the forward rotation of the internal ring gear 110, thus bringing the car to a stop. Further clockwise rotation of the yoke will bring about a still further increase in the speed of the sun gear 105 in a reverse direction and will cause the car to go into reverse.

Figure 10:
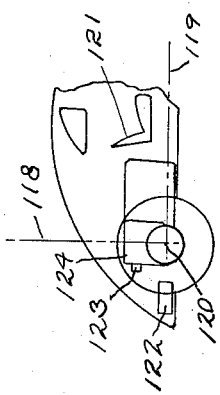
Fig. 10 is a diagrammatic view showing the relative location of the motor and transmission with respect to certain parts of an automobile.

It will be noted that the axis of the shaft 112 and sleeve 111 of the friction drive may be made to extend radially in any desired direction with respect to the radial direction with which the main drive shaft 107 extends. Thus, in Fig. 10, the axis 118 of the friction speed controller is shown as extending vertically whereas the axis 119 of the main drive shaft is shown as extending horizontally. This enables a compact arrangement of transmission and motor and enables the motor to be brought up close to the rear axle 120 back of the rear seat 121 of the car. The location of the transmission enables the gas tank 122 to be conveniently located close up to the rear axle. The starter motor 123 may be mounted on the transmission housing 124 and connected to drive the driving friction wheel 3.

Further modifications will be apparent to those skilled in the art and it is desired, therefore, that the invention be limited only by the prior art and the scope of the appended claims.

Having thus described my invention, what I claim and desire to secure by Letters Patent is:

1. A variable speed friction planetary transmission comprising a driving shaft, a driven shaft, a planetary transmission mechanism, and a friction transmission mechanism, said planetary mechanism comprising a first gear controlled by the friction transmission mechanism, a second gear coaxial with said first gear, a gear carrier coaxial with said gears, and planetary gearing carried by said gear carrier and meshing with said gears, and means whereby said driven shaft may be alternatively connected to rotate either with said second gear or with said gear carrier and whereby said driving shaft may be alternatively connected to cause rotation either of said gear carrier or of said second gear.

2. A variable speed friction planetary transmission comprising a driving shaft, a driven shaft, a planetary transmission mechanism, and a friction transmission mechanism, said planetary mechanism comprising a first gear controlled by the friction transmission mechanism, a second gear coaxial with said first gear, a gear carrier coaxial with said gears, and planetary gearing carried by said gear carrier and meshing with said gears, and means whereby said driven shaft may be alternatively connected to rotate either with said second gear or with said gear carrier and whereby said driving shaft may be alternatively connected to cause rotation either of said gear carrier or of said second gear, said transmission comprising means whereby said first gear may be caused to rotate in one direction in one position of the friction mechanism and in the opposite rotational direction in another position of the friction mechansm.

3. A variable speed friction planetary transmission comprising a driving shaft, a driven shaft, a planetary transmission mechanism, and a friction transmission mechanism, said planetary mechanism comprising a first gear controlled by the friction transmission mechanism, a second gear coaxal with said first gear, a gear carrier coaxial with said gears, and planetary gearing carried by said gear carrier and meshing with said gears, and means whereby said driven shaft may be alternatively connected to rotate either with said second gear or with said gear carrier and whereby said driving shaft may be alternatively connected to cause rotation either of said gear carrier or of said second gear, said transmission comprising means whereby said first gear may be caused to rotate in one direction in one position of the friction mechanism and in the opposite rotational direction in another position of the friction mechanism and may be held against rotation in either direction in another position of the friction transmission mechansm.

4. A variable speed friction planetary transmission comprising a driving shaft, a driven shaft, a planetary transmission mechanism, and a friction transmission mechanism, said planetary mechanism comprising a first gear controlled by the friction transmission mechanism, a second gear coaxial with said first gear, a gear carrier coaxial with said gears, and planetary gearing carried by said gear carrier and meshing with said gears, and means whereby said driven shaft may be alternatively connected to rotate either with said second gear or with said gear carrier and whereby said driving shaft may be alternatively connected to cause rotation either of said gear carrier or of said second gear, said transmission comprising means whereby said first gear may be caused to rotate in one direction in one position of the friction mechanism and in the opposite rotational direction in another position of the friction mechanism, and whereby all three coaxial elements of the planetary mechanism may be caused to rotate in the same rotational direction and at the same speed in another position of the friction mechanism.

5. A variable speed friction planetary transmission for a divided driving axle of an automobile comprising a differential gear mechanism for the two parts of the axle, a planetary gear mechanism for controlling the speed of the differential gear, a power driving mechanism, and a friction transmission mechanism, said differential gear comprising two coaxial gears, a gear carrier coaxial with said gears, and gearing carried by said gear carrier and meshing with said gears, said planetary gear mechanism comprising two coaxial gears, a gear carrier coaxial with said gears, and a planetary gearing carried by said gear carrier and meshing with said gears, the gear carrier of the differential mechanism being rotatable with the gear carrier of the planetary mechanism, one gear of the planetary gear mechanism being driven by said power driving mechanism and the other gear of the planetary gear mechanism being controlled in its speed by the friction transmission mechanism.

6. A variable speed friction transmission comprising a driving friction wheel, a driven friction wheel coaxial therewith, a spheroidal idler for transmitting power from said driving wheel to said driven wheel swiveled about an axis lying in a plane substantially perpendicular to the axis of said friction wheels, at least one of said friction wheels being mounted for axial movement, clutch mechanism for connecting said driven wheel to rotate in unison with said driving wheel controlled by the axial movement of said wheel, said spheroidal idler having a wheel-engaging contour shaped to control the axial movement of said axially movable wheel.

7. A variable speed friction transmission comprising a driving friction wheel, a driven wheel coaxial therewith, a spheroidal idler for transmitting power from said driving wheel to said driven wheel swiveled about an axis lying in a plane substantially perpendicular to the axis of said friction wheels, said driven friction wheel being mounted for axial movement, and means for holding said driven friction wheel against rotation controlled by said axial movement, said spheroidal idler having a wheel engaging portion shaped to control said axial movement.

8. A friction transmission comprising a driving friction wheel, a driven friction wheel, and friction transmission means between said driving wheel and driven wheel, one of said wheels being mounted for axial movement, clutch means connecting said driven friction wheel to rotate in unison with said driving friction wheel controlled by said axial movement, the transmission between said wheels having a wheel-engaging portion shaped to control said axial movement.

9. A friction transmission comprising a driving friction wheel, a driven friction wheel, and friction transmission between said wheels, one of said friction wheels being mounted for axial movement, means for controlling the rotary movement of one of said wheels controlled by said axial movement, the transmission between said wheels having a wheel-engaging portion shaped to control said axial movement.

10. A friction transmission comprising a driving friction wheel, a driven friction wheel, and friction transmission between said wheels, one of said wheels being mounted for axial movement, means for holding one of said wheels against rotation, said holding means being controlled by said axial movement, the transmission between said wheels having a wheel-engaging portion shaped to control said axial movement.

11. A variable speed transmission comprising two rotatable coaxial friction members, means for transmitting power from one of said coaxial members to the other comprising an intermediate friction member shiftable to vary its contactual relation with respect to one of said coaxial members to change the speed ratio, said intermediate friction member having an axial sectional contour such as to cause axial movement of a friction member engaged thereby as the intermediate member is shifted, and clutch means for controlling the movement of at least one of said coaxial members controlled by said axial movement.

12. A variable speed transmission comprising two rotatable coaxial friction members, means for transmitting power from one of said coaxial members to the other comprising an intermediate friction member shiftable to vary its contactual relation with respect to one of said coaxial members to change the speed ratio, said intermediate friction member having an axial sectional contour such as to cause axial movement of a friction member engaged thereby as the intermediate member is shifted, and clutch means for connecting said coaxial members to rotate in unison, controlled by said axial movement.

13. A variable speed transmission comprising a drive shaft, a driven shaft, a planetary transmission, said planetary transmission comprising a sun gear, a ring gear, a gear carrier, a planetary gearing carried by said gear carrier and meshing with said sun gear and ring gear, means for selectively connecting said driven shaft to rotate either in unison with said ring gear or in unison with said gear carrier, comprising dog clutch means rotatable with said driven shaft and movable with respect thereto and dog clutch means rotatable with said ring gear and gear carrier respectively and cooperating with said movable dog clutch means, means connecting the gear carrier to rotate in unison with said drive shaft, means for holding the sun gear against rotation to effect overdrive of the driven shaft when the driven shaft is connected with the ring gear, and means for releasing said holding means to enable the sun gear to be rotated in unison with the gear carrier and ring gear for direct drive.

14. A variable speed transmission comprising a planetary transmission and a variable torque transmission, said planetary transmission comprising a sun gear, a ring gear coaxial therewith, a gear carrier coaxial with said gears and planetary gearing carried by said gear carrier and meshing with said gears, said variable torque transmission comprising a driving rotor, a driven rotor, and variable torque transmission means acting between said rotors, said sun gear being rotatable with said driven rotor, a driven shaft, means for connecting said gear carrier with said driven shaft and holding the ring gear against rotation for driving the driven shaft at a slower speed than the speed of the sun gear, and means for disconnecting said gear carrier from said driven shaft and for holding said gear carrier against rotation and for connecting the ring gear with the driven shaft to rotate the driven shaft in a reverse direction to that of the sun gear and at a slower speed than the speed of the sun gear.

15. A variable speed transmission comprising a planetary transmission and a variable torque transmission, said planetary transmission comprising a sun gear, a ring gear coaxial therewith, a gear carrier coaxial with said gears and planetary gearing carried by said gear carrier and meshing with said gears, said variable torque transmission comprising a driving rotor, a driven rotor, and variable torque transmission means acting between said rotors, a driving shaft for driving said driving rotor, a driven shaft, means for connecting one of said gears to rotate with the driving shaft, means for connecting the other of said gears to rotate with the driven rotor, and means for connecting the driven shaft to rotate with the gear carrier for normal forward drive of the driven shaft, means for disconnecting the ring gear from its driving means and holding it against rotation to effect slower forward speed of the driven shaft, and means for disconnecting said gear carrier from said driven shaft and for holding it against rotation and for connecting the ring gear with the driven shaft to rotate the driven shaft in a reverse direction to that of the sun gear and at a slower speed than the speed of the sun gear.

16. A variable speed transmission comprising a driving shaft, a driven shaft coaxial therewith, a three-element planetary comprising a sun gear, a ring gear with larger pitch diameter than the sun gear and coaxial therewith and connected to rotate with said driving shaft and coaxial therewith, a gear carrier, a planetary gearing carried by said gear carrier and meshing with said sun gear and ring gear, said gear carrier being connected to rotate with the driven shaft, and friction means for causing said sun gear to rotate in the same direction as said driving shaft or to rotate in the opposite direction, whereby in both directions of rotation of the sun gear the torque transmitted to the gear carrier by friction is less than the torque transmitted to the gear carrier by the ring gear, said friction means comprising two coaxial friction wheels, a spherical idler engaging said wheels, bearing means on which said idler is rotatably mounted, and a frame on which said bearing means are mounted, oscillatable to bring portions of said idler of different radii into engagement with said wheels to change the speed ratio and to reverse the rotation of the driven friction wheels, said driving shaft extending through both of said friction wheels and being secured to rotate with the ring gear, one of said friction wheels being connected to rotate with the driving shaft and the other friction wheel being connected to rotate with the sun gear.

17. In combination with a motor having a rotary drive shaft and a differential having a pair of coaxial driven shafts parallel with said drive shaft for driving the traction wheels of an automobile, of transmission between said drive shaft and differential comprising a rotary transmission member coaxial with said drive shaft through and beyond which said drive shaft extends from said motor, and clutch means coaxial with said drive shaft and on the opposite side of said rotary transmission member from said motor for controlling the transmission of power from said drive shaft extension to said rotary transmission member.

18. In combination with a motor having a rotary drive shaft and a differential having a pair of coaxial driven shafts parallel with said drive shaft for driving the traction wheels of an automobile, of transmission between said drive shaft and differential comprising a rotary transmission member coaxial with said drive shaft through and beyond which said drive shaft extends from said motor, clutch means coaxial with said drive shaft and on the opposite side of said rotary transmission member from said motor for controlling the transmission of power from said drive shaft extension to said rotary transmission member, and variable speed transmission means between said clutch means and said rotary transmission member.

19. In combination with a motor having a rotary drive shaft and a differential having a pair of coaxial driven shafts parallel with said drive shaft for driving the traction wheels of an automobile, of transmission between said drive shaft and differential comprising a rotary transmission member coaxial with said drive shaft through and beyond which said drive shaft extends from said motor, clutch means coaxial with said drive shaft and on the opposite side of said rotary transmission member from said motor for controlling the transmission of power from said drive shaft extension to said rotary transmisison member, and variable speed transmission means between said clutch means and said rotary transmission member comprising a gear through which said shaft extension extends.

20. In combination with a motor having a rotary drive shaft and a differential having a pair of coaxial driven shafts parallel with said drive shaft for driving the traction wheels of an automobile, of transmission between said drive shaft and differential comprising a rotary transmisison member coaxial with said drive shaft through and beyond which said drive shaft extends from said motor, clutch means coaxial with said drive shaft and on the opposite side of said rotary transmission member from said motor for controlling the transmission of power from said drive shaft extension to said rotary transmission member, and variable speed transmission means between said clutch means and said rotary transmission member comprising a planetary transmission including a first rotary gear member, a second rotary gear member, a rotary carrier member, and planetary gearing carried by said gear member and meshing with said gear members, said rotary planetary members being coaxial with said drive shaft, one of said rotary planetary members being rotatable with said rotary transmission member, one of said rotary planetary members being rotatable with said drive shaft, and one of said rotary planetary members being driven from said clutch means.

21. In combination with a motor having a rotary drive shaft and a differential having a pair of coaxial driven shafts parallel with said drive shaft for driving the traction wheels of an automobile, of transmission between said drive shaft and differential comprising a rotary transmission member coaxial with said drive shaft through and beyond which said drive shaft extends from said motor, clutch means coaxial with said drive shaft and on the opposite side of said rotary transmission member from said motor for controlling the transmission of power from said drive shaft extension to said rotary transmission member, and variable speed transmission means between said clutch means and said rotary transmission member comprising a gear member driven from said clutch member through which said shaft extension extends and a gear member coaxial with said rotary transmission member through which said shaft extension extends.

22. A variable speed transmission comprising a drive shaft, a driven shaft, a planetary transmission, said planetary transmission comprising a sun gear, a ring gear, a gear carrier, and a planetary gear carried by said gear carrier and meshing with said sun gear and ring gear, means connecting the gear carrier to rotate in unison with the drive shaft, means for changing the speed ratio between said drive shaft and said driven shaft comprising dog clutch means rotatable with said driven shaft and movable with respect thereto, and dog clutch means rotatable with said ring gear and gear carrier, respectively, and cooperating with said movable dog clutch means for selectively connecting said driven shaft to rotate either in unison with the ring gear or in unison with said gear carrier, means for holding the sun gear against rotation to effect overdrive of the driven shaft when the driven shaft is connected with the ring gear, and means for releasing said holding means to enable the sun gear to be rotated in unison with the gear carrier and ring gear for direct drive.

23. A variable speed transmission comprising a drive shaft, a driven shaft noncoaxial therewith, an infinitesimally variable speed transmission, a rotatable toothed drive member, a transmission between said toothed member and said noncoaxial shaft, said infinitesimally variable transmission comprising a driving rotor and a driven rotor, said toothed member being driven from said driven rotor, said drive shaft extending through said rotors and through said toothed member, clutch means for connecting said driving rotor for rotation with said drive shaft and for disconnecting it from rotation therewith, and clutch means for connecting said drive shaft for driving relation with respect to said rotatable toothed member and for disconnecting it from said driving relationship.

24. A variable speed transmission comprising a drive shaft, a driven shaft coaxial therewith and extending therefrom, and a power flow transmission between said drive shaft and said driven shaft comprising a planetary gearing including a sun gear through which said drive shaft extends, an internal gear, a gear carrier and a planetary gearing carried by said gear carrier and meshing with said sun gear and internal gear, an infinitesimally variable torque changing transmission comprising a driving rotor, a driven rotor coaxial therewith and with said shafts and both rotatable in the same direction as said drive shaft and a reactance device acting between said rotors with respect to which both of said rotors have an infinitesimally variable speed relation, each of said rotors having a substantially constant torque radius, means connecting said driven shaft to rotate with the internal gear, means connecting the gear carrier to rotate with the drive shaft, and means connecting said sun gear to rotate with one of said rotors in the same direction as said drive shaft.

25. A variable speed transmission comprising a driving shaft, a driven shaft coaxial therewith, a three-element planetary comprising (1) a first gear, (2) a second gear coaxial therewith and (3) a gear carrier and planetary gearing carried thereby meshing with said coaxial gears, means for controlling the rotation of one of said gears, and clutch means for selectively connecting the other gear either with the driving shaft or with the driven shaft and for selectively connecting the gear carrier either with the driven shaft or the driving shaft.

26. A variable speed transmission comprising a driving shaft, a driven shaft coaxial therewith, a three-element planetary comprising (1) a first gear, (2) a second gear coaxial therewith and (3) a gear carrier and planetary gearing carried thereby meshing with said coaxial gears, means for controlling the rotation of one of said gears, and clutch means for selectively connecting the other gear either with the driving shaft or with the driven shaft and for selectively connecting the gear carrier either with the driven shaft or the driving shaft, said means for controlling the rotation of one of said gears comprising releasable gripping means for holding said gear against rotation.

27. A variable speed transmission comprising a driving shaft, a driven shaft coaxial therewith, a three-element planetary comprising (1) a first gear, (2) a second gear coaxial therewith and (3) a gear carrier and planetary gearing carried thereby meshing with said coaxial gears, means for controlling the rotation of one of said gears, and clutch means for selectively connecting the other gear either with the driving shaft or with the driven shaft and for selectively connecting the gear carrier either with the driven shaft or the driving shaft, said means for controlling the rotation of one of said gears comprising releasable gripping means for connecting said gear to rotate with said driving shaft.

28. A variable speed transmission comprising a driving shaft, a driven shaft coaxial therewith, a three-element planetary comprising (1) a first gear, (2) a second gear coaxial therewith and (3) a gear carrier and planetary gearing carried thereby meshing with said coaxial gears, means for controlling the rotation of one of said gears, and clutch means for selectively connecting the other gear either with the driving shaft or with the driven shaft and for selectively connecting the gear carrier either with the driven shaft or the driving shaft, said means for controlling the rotation of one of said gears comprising releasable gripping means for holding said gear against rotation and for connecting said gear to rotate with said driving shaft.

29. A variable speed transmission comprising a first shaft, a second shaft, a three-element planetary comprising (1) a first gear, (2) a second gear, and (3) a gear carrier and planetary gearing carried thereby meshing with said gears, means for controlling rotation of said first gear, and clutch means which in one position connect the first shaft with the second gear and the second shaft with the gear carrier and which in another position connect the first shaft with the gear carrier and the second shaft with the second gear.

30. A variable speed transmission comprising a driving shaft, a driven shaft coaxial therewith and a three element planetary gear construction comprising a sun spur gear having an opening through which said driving shaft extends, an internal ring gear rotatable with said driving shaft, a gear carrier rotatable with said driven shaft and planetary gearing carried by said gear carrier and meshing with said sun gear and ring gear and means for controlling the rotation of said sun gear, said gear carrier comprising bearing means on which said planetary gearing is mounted and a housing on which said bearing means are mounted surrounding said ring gear and rotatable with said driven shaft, a clutch member lying between said ring gear and sun gear and secured to said bearing means, a clutch means rotatable with said housing, clutch means rotatable with said ring gear, clutch means rotatable with said driving shaft and clutch means rotatable with said driven shaft, said clutch means being shiftable to connect the driving shaft either with the ring gear or with the clutch member and to connect the driven shaft either with said housing or with said ring gear.

31. A variable speed transmission comprising a first shaft, a second shaft, a three-element planetary gear construction comprising (1) a first gear, (2) a second gear, and (3) a gear carrier and planetary gearing carried thereby meshing with said gears, and clutch instrumentalities which in one position connect the first shaft with the second gear and the second shaft with the gear carrier and which in another position connect the first shaft with the gear carrier and the second shaft with the second gear.

32. A variable speed transmission comprising a first shaft, a second shaft, a three-element planetary gear construction comprising (1) a first gear, (2) a second gear, and (3) a gear carrier and planetary gearing carried thereby meshing with said gears, clutch instrumentalities which in one position connect the first shaft with the second gear and the second shaft with the gear carrier and which in another position connect the first shaft with the gear carrier and the second shaft with the second gear, and means for holding said first gear against rotation.

33. A variable speed transmission comprising a drive shaft, a driven shaft coaxial therewith and extending therefrom, and a power flow transmission between said drive shaft and said driven shaft comprising a planetary gearing including a sun gear through which said drive shaft extends, an internal gear, a gear carrier and a planetary gearing carried by said gear carrier and meshing with said sun gear and internal gear, an infinitesimally variable torque changing transmission comprising a driving rotor, a driven rotor coaxial therewith and with said shafts and both rotatable in the same direction as said drive shaft and a reactance device acting between said rotors with respect to which both of said rotors have an infinitesimally variable speed relation, each of said rotors having a substantially constant torque radius, means connecting said driven shaft to rotate with the internal gear, means connecting the gear carrier to rotate with the drive shaft, and means connecting said sun gear to rotate with one of said rotors in the same direction as said drive shaft, the other rotor being connected to rotate with the drive shaft.

34. A variable speed transmission comprising a drive shaft, a driven shaft coaxial therewith and extending therefrom, and a power flow transmission between said drive shaft and said driven shaft comprising a planetary gearing including a sun gear through which said drive shaft extends, an internal gear, a gear carrier and a planetary gearing carried by said gear carrier and meshing with said sun gear and internal gear, an infinitesimally variable torque changing transmission comprising a driving rotor, a driven rotor coaxial therewith and with said shafts and both rotatable in the same direction as said drive shaft and a reactance device acting between said rotors with respect to which both of said rotors have an infinitesimally variable speed relation, each of said rotors having a substantially constant torque radius, said drive shaft extending through both of said rotors, means connecting said driven shaft to rotate with the internal gear, means connecting the gear carrier to rotate with the drive shaft, and means connecting said sun gear to rotate with one of said rotors in the same direction as said drive shaft.

35. A variable speed transmission comprising a drive shaft, a driven shaft, a planetary transmission, an infinitesimally varible torque ratio changing transmission interposed between said planetary transmission and one of said shafts, said planetary transmission comprising a sun gear, a ring gear, a gear carrier, and a planetary gear carried by said gear carrier and meshing with said sun gear and ring gear, said infinitesimally variable torque ratio changing transmission comprising a driving rotor, a driven rotor coaxial therewith and with said shafts and a reactance device acting between said rotors with respect to which both of said rotors have an infinitesimally variable speed relation, means connecting the gear carrier to rotate in unison with the drive shaft, means for changing the speed ratio between said drive shaft and said driven shaft comprising dog clutch means rotatable with said driven shaft and movable with respect thereto, and dog clutch means rotatable with said ring gear and gear carrier, respectively, and cooperating with said movable dog clutch means for selectively connecting said driven shaft to rotate either in unison with the ring gear or in unison with said gear carrier, means for holding the sun gear against rotation to effect overdrive of the driven shaft when the driven shaft is connected with the ring gear, and means for releasing said holding means to enable the sun gear to be rotated in unison with the gear carrier and ring gear for direct drive.

WILLARD L. POLLARD.